J. L. Mott.

Agricultural Boiler.

No. 431. Reissued Feb. 24, 1857.

Witnesses;
Wm. H. Bishop
Joel B. Wilson

Inventor;
Jordan L. Mott

UNITED STATES PATENT OFFICE.

JORDAN L. MOTT, OF MOTT HAVEN, NEW YORK.

IMPROVEMENT IN THE MODE OF CONSTRUCTING A COMBINED CALDRON AND FURNACE FOR THE USE OF AGRICULTURISTS AND OTHERS.

Specification forming part of Letters Patent No. 1,873, dated December 1, 1840; extended December 1, 1854; Reissue No. 296, dated February 6, 1855; Reissue No. 431, dated February 24, 1857.

*To all whom it may concern:*

Be it known that I, JORDAN L. MOTT, of Mott Haven, Westchester county, in the State of New York, have invented new and useful Improvements in the Mode of Constructing a Combined Portable Caldron and Furnace for the Use of Agriculturists and Others; and I do hereby declare that the following is a full, clear, and exact description thereof, reference being had to the accompanying drawings, making part of this specification, in which—

Figure 1:
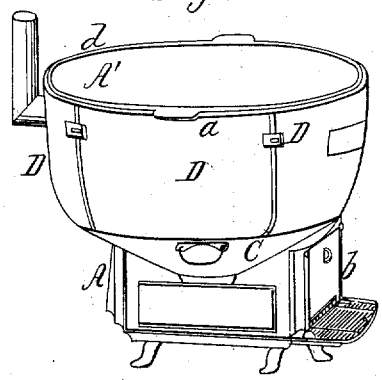
Figure 2:
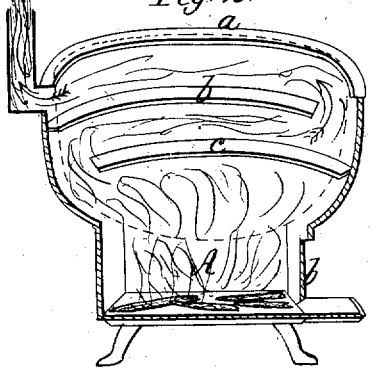

Figure 1 is a perspective view of the combined furnace and caldron; Fig. 2, a sectional view of the furnace with the caldron removed, and Fig. 3 a perspective view of a modified form of the combined furnace and caldron.

Prior to my said invention many attempts were made to produce a portable furnace and pot for culinary purposes; but, so far as I am informed, without success. A large caldron, in contradistinction to a mere pot, is an article of great use, particularly among farmers. It is generally required to be of great capacity, and should be portable, that it may be readily removed from place to place, where its use may be most convenient. To combine a vessel of such capacity with a furnace of a square or quadrangular form, suited to the burning of wood, with economy, this being the kind of fuel generally used by farmers, the whole structure requires to be made of cast metal, for cheapness, and yet sufficiently light to be conveniently moved from place to place. Such was the article required, and which, for the first time, was produced by my said invention.

In view of the objects to be attained, my said invention consists in combining a round caldron, or one of analogous shape, with a small portable, square, or quadrangular box-stove below, for burning wood, so that the area of the fire-chamber shall be smaller than the caldron, with the view to reduce the weight, the cost of construction, and economy of fuel, the said combination being effected by spreading or swelling out the upper part of the sides of the box-stove, raising them with the front and back, in a circular form, to surround the whole or the most important part of the caldron, and leaving a flue-space between this enlarged part of the box-stove and the caldron for the circulation of the products of combustion around and under the caldron before escaping from the exit-pipe, thus exposing a much larger surface of the caldron to the action of the heat than could be otherwise obtained from a fire-chamber of comparatively small capacity, the whole being cast of iron, and fitted and bound together to be easily moved from place to place, for convenience in use; and my said invention also consists in combining with the parts so spread out sectional pieces fitted and secured thereto and to each other, whereby the whole of the caldron may be surrounded by a flue-space.

Figure 3:
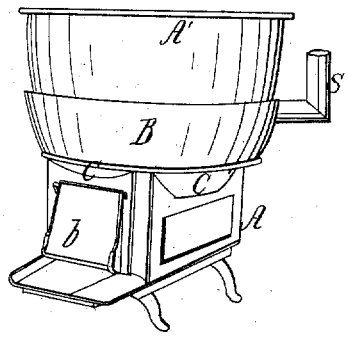

In the accompanying drawings, A represents the furnace, made in the usual form of a box-stove, for burning wood, with a door, *b*, in front, for the introduction of the fuel. The upper part of each of the four plates constituting the front, back, and the two sides is cast with a flaring portion, which spreads out in the form of a segment of a circle, C, so that when the four plates are united the rectangular box-like stove or furnace spreads out and presents at top a circular rim. When it is not required to inclose the entire outer surface of the caldron, a circular ring, B, Fig. 3, is cast so as to fit onto the upper edge of the segment C, and the upper edge of this ring B is cast with a flange projecting inward to fit the outer circumference of the caldron, just above what may be termed the "bottom" thereof, leaving a flue-space for the circulation of the products of combustion on the entire bottom, as such products pass to the smoke-pipe S, fitted to the ring B, and near the upper edge thereof; but when the entire outer surface of the caldron is to be heated, then I cast sectional pieces D with their lower edges fitted to and made to lap either inside or outside of the segments C, to form a good joint, and the edges of these segments are fitted to each other with projecting catches on the edge of one plate entering mortises in lips cast on the corresponding edge of the next sectional piece, the whole being secured by keys or equivalent means. The sectional pieces may be cast with a flange, *a*, at top, on which the rim *d* of the caldron A′ rests and fits accurately to prevent the escape and waste of heat. One of the sectional pieces D is provided with a nozzle to receive the smoke-pipe; and, if desired, these sectional pieces may be provided with projecting strips or flanges *b c*, to give a spiral direction to the products of combustion in passing from the fire-chamber to the smoke-pipe, with a view to the better distribution of the heat on every part of the external surface of the caldron. The flue-space around the caldron should be from one to two inches, more or less, depending on the size of the caldron. In this way it will be seen that a combined caldron and box-stove adapted to the burning of wood can be made of cast-iron, cheap, and light, so that it can be conveniently carried from place to place, and so adapted that with a very small amount of fuel a very large caldron can be heated economically.

It will be obvious from the foregoing that the ring B may be formed by extending the segments C to the entire height of the ring B, or any other required height.

What I claim as my invention, and desire to secure by Letters Patent, is—

1. Combining a caldron with a small square rectangular box-stove, of less area than the caldron, by spreading out the upper part of the box-stove to a circular form to surround the caldron by a flue-space, substantially as and for the purpose specified.

2. Making the casing to form a flue-space around the caldron by elevating and spreading the plates of the stove, in combination with sectional side pieces, substantially in the manner and for the purpose specified.

JORDAN L. MOTT.

Witnesses:
WM. H. BISHOP,
JOEL B. WILSON.